United States Patent
Hoffmann et al.

(10) Patent No.: US 7,633,205 B2
(45) Date of Patent: Dec. 15, 2009

(54) ELECTRIC MACHINE

(75) Inventors: Thilo Hoffmann, Graz (AT); Andreas Jöckel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 169 days.

(21) Appl. No.: 10/596,030

(22) PCT Filed: Nov. 22, 2004

(86) PCT No.: PCT/EP2004/053036

§ 371 (c)(1),
(2), (4) Date: Mar. 19, 2007

(87) PCT Pub. No.: WO2005/053134

PCT Pub. Date: Jun. 9, 2005

(65) Prior Publication Data
US 2008/0036328 A1 Feb. 14, 2008

(30) Foreign Application Priority Data
Nov. 26, 2003 (DE) ................... 103 55 267

(51) Int. Cl.
*H02K 21/00* (2006.01)
(52) U.S. Cl. .............. 310/254; 310/216.001; 180/65.51
(58) Field of Classification Search ......... 310/216–218, 310/254, 258, 259; 180/65.51
See application file for complete search history.

(56) References Cited

U.S. PATENT DOCUMENTS

| | | | |
|---|---|---|---|
| 2,946,941 A * | 7/1960 | Jin | 318/776 |
| 3,783,318 A | 1/1974 | Widstrand | |
| 4,469,970 A * | 9/1984 | Neumann | 310/156.78 |
| 4,864,177 A | 9/1989 | Yang | |
| 5,432,644 A * | 7/1995 | Tajima et al. | 360/99.04 |
| 5,698,913 A * | 12/1997 | Yagi et al. | 310/58 |
| 6,023,838 A * | 2/2000 | Yamakoshi et al. | 29/596 |
| 6,215,220 B1 * | 4/2001 | Cooke | 310/136 |
| 6,975,055 B2 * | 12/2005 | Joong et al. | 310/156.01 |
| 2002/0117926 A1 | 8/2002 | Joong et al. | |

FOREIGN PATENT DOCUMENTS

| | | |
|---|---|---|
| CH | 433 503 | 4/1967 |
| DE | 911 759 | 5/1954 |
| DE | 920 739 | 11/1954 |
| DE | 11 70 522 | 5/1964 |
| DE | 11 86 547 | 9/1965 |
| EP | 0 509 635 | 10/1992 |
| JP | 2002 064949 | 2/2002 |
| WO | WO 00/62400 | 10/2000 |

* cited by examiner

*Primary Examiner*—Dang D Le
(74) *Attorney, Agent, or Firm*—Henry M. Feiereisen; Ursula B. Day

(57) ABSTRACT

In order to be able to electric drives in very tight installation spaces, e.g. in propulsion vehicles or machine tools, an electric machine (1) is proposed having a stator and a rotor (28), with the laminations (2) of the stator have axial slots (4) and teeth (5, 6) extending between adjacent slots (4) in direction air gap. At least a predefined number of the teeth (6) is configured as a single-tooth winding (7), and at least one section (3) is provided in circumferential direction of the stator and is designed without slots but follows the contour of the stator bore (11) in the area of the air gap.

5 Claims, 9 Drawing Sheets

ELECTRIC MACHINE

BACKGROUND OF THE INVENTION

The invention relates to an electric machine and its application in electric propulsion vehicles for example.

Electric machines, in particular permanent magnet excited synchronous machines are used, i.a., in machine tool manufacture. Hereby, and this is true also for rail vehicles, as a result of the limited installation space, problems are experienced in machine tools, and in particular in low-floor rail vehicles, as far as accommodation of powerful drives is concerned. The required ground clearance and wheel wear limit the installation space downwards. In addition, when rail vehicles with wheel sets are involved that are very shallow, the spring compression of the vehicle body limits the installation space upwards.

U.S. Pat. No. 4,864,177 discloses a stator for a two-pole single-phase induction motor having varying length and cross dimensions as a result of its physical operating principle. Different yoke heights are hereby provided at same slot depth.

U.S. Pat. No. 3,783,318 discloses a stator of an induction motor having different slot depths to result in varying length and cross dimensions.

SUMMARY OF THE INVENTION

The invention is therefore based on the object to provide a drive which can be installed even in tight installation spaces at slight energy consumption while generating a comparably high torque and which requires little maintenance. In addition, the drive should be easy to manufacture.

The posed object is attained by an electric machine including a stator and a rotor, with the lamination stack of the stator having axial slots and teeth extending between the adjacent slots in direction air gap, wherein at least a predefined number of teeth are respectively surrounded by tooth coils, and at least one section is provided in circumferential direction of the stator and designed without slots while following the contour of the stator bore in the area of the air gap.

When used in an electric vehicle, such an electric machine according to the invention generates sufficient torque at reduced noise development and energy consumption in order to accelerate such propulsion vehicles. As individual tooth coils are used about the teeth, the absence of a stator winding in circumferential spaced-apart rotation-symmetric relationship is hereby of particular advantage.

As these tooth coils are advantageously pre-fabricated, it is only necessary to place them onto the respective teeth. The tooth coils may advantageously also be provided on coil bobbins which can then be secured to the tooth through material union, form-fitting engagement or friction engagement.

The electric machine according to the invention as drive of an electric propulsion vehicle meets the demands of ground clearance and restriction of spring compressions of a vehicle body while generating comparably higher torque. Especially advantageous is a configuration of this electric machine as direct drive.

A direct drive is hereby understood to be a drive without transmission. The torque may hereby be transmitted by a clutch onto the wheels or wheel set. As a result, the drive is suspended in the undercarriage and thus cushioned.

According to a further configuration, the drive straddles without clutch directly on the wheel set shaft; it is thus unsprung and part of the wheel set. The rotor is provided with permanent magnets. In particular when the permanent magnet excited synchronous machine has a large number of poles, the rotor has permanent magnets which are advantageously disposed in flux concentration arrangement in order to realize increased flux density in the air gap.

Advantageously, the coil width is hereby a multiple of the pole pitch.

It is especially advantageous when the slotless sections oppose one another because the height of the installation space can then be reduced and in particular ground clearance and spring compression are positively affected.

BRIEF DESCRIPTION OF THE DRAWING

The invention as well as further advantageous constructions of the invention are described in more detail and schematically illustrated in the drawing, in which.

DETAILED DESCRIPTION OF PREFERRED EMBODIMENTS

Figure 1:
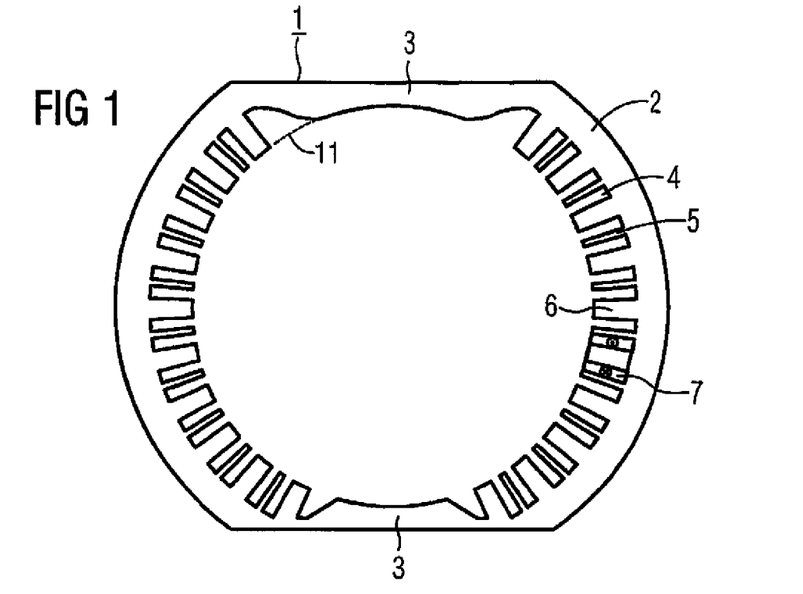
FIGS. 1 to 3 show lamination pieces of electric machines according to the invention.

FIG. 1 shows a lamination 2 of a stator of an electric machine 1. The laminations 2 are stacked and have two opposing sides which are designed without slots. The thus slotless sections 3 are each characterized in circumferential direction by a segment of about 60°. The remainder of the cross sectional area of the lamination 2 has slots 4 which form part of a gapped tooth coil winding 7. Wide teeth 6 alternate hereby with narrow teeth 5, with the narrow teeth 5 having no winding, whereas the wider teeth 6 have a winding. Advantageously, the winding coils are hereby prefabricated tooth coils 7. A slot 4 thus accommodates only a feed conductor or a return conductor of a tooth coil 7. The electric machine 1 is designed with a large number of poles, i.e. it has more than about twenty poles.

Figure 2:
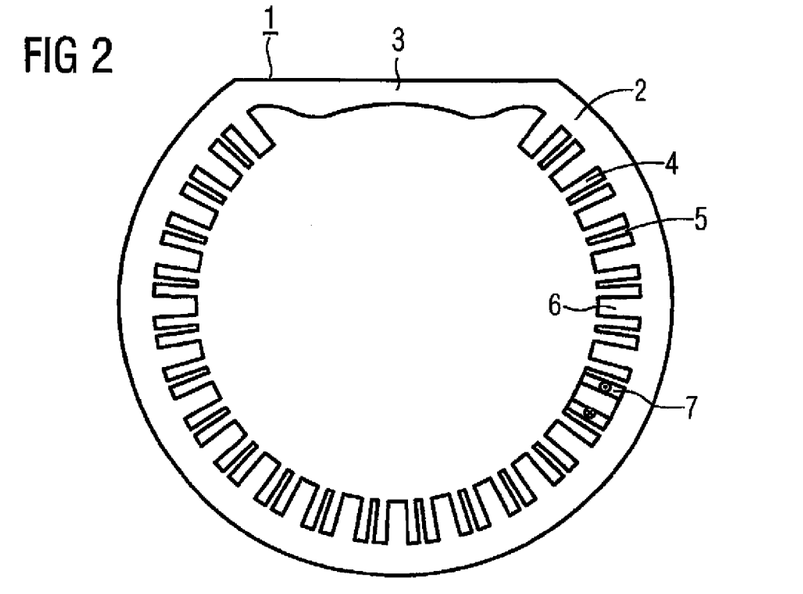
Figure 21:
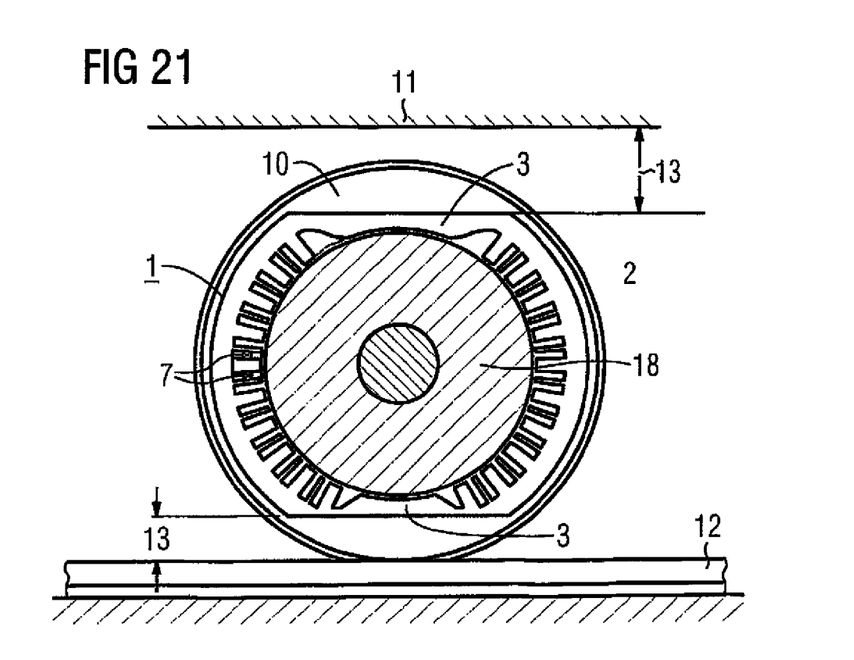
FIG. 21 shows a cross section of an unsprung direct drive.

FIG. 2 shows like FIG. 21 a gapped tooth coil winding, having, however, only one section 3 without slot. Only the wide teeth are surrounded by tooth coils 7.

This exceptional structure of the stator of a synchronous machine is possible only with tooth coils 7. Therefore, there is no need for a rotation-symmetric stator winding that is continuously spaced about the circumference of the synchronous machine. As a result, the torque of such a synchronous machine according to the invention, i.e. the toque usage compared to rotation-symmetric machines 1, can be significantly increased while the installation height (=axial height) remains the same. Application of such electric machines 1 as drive motors for directly propelling wheel sets for rail vehicles enables a reduction of e.g. the degree of motorization and thus a saving of costs. Such electric machines 1 require a comparably limited installation space so that they can be used in particular in low-floor vehicles or in machine tool manufacture.

Despite the gapped tooth coil winding, torque ripple of the electric machine remains in a tolerable range for a traction drive as a consequence of the large number of poles.

For application in machine tool manufacture or other production machines, the more stringent demands on torque ripple in machine tool manufacture can be met, for example, by skewing the slots of the laminations 2 of the stator and/or skewing the permanent magnets 20 of the roror 28. The synchronous machine has hereby in particular a skewing which ranges between 0.4 times and 0.6 times of a slot pitch.

Figure 3:
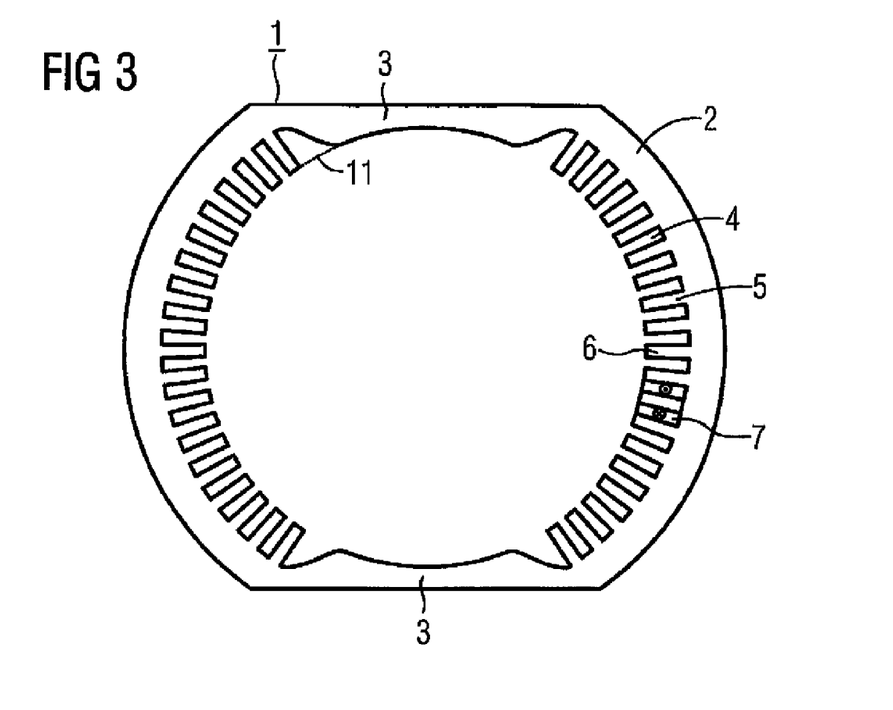

FIG. 3 shows a lamination 2 with an un-gapped tooth coil winding and two slotless sections 3.

Figure 4:
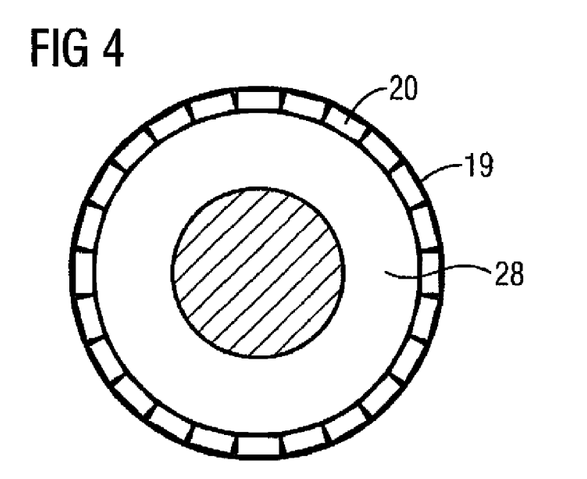
FIGS. 4, 5 shows an arrangement of permanent magnets in an armature of an electric machine according to the invention.
Figure 5:
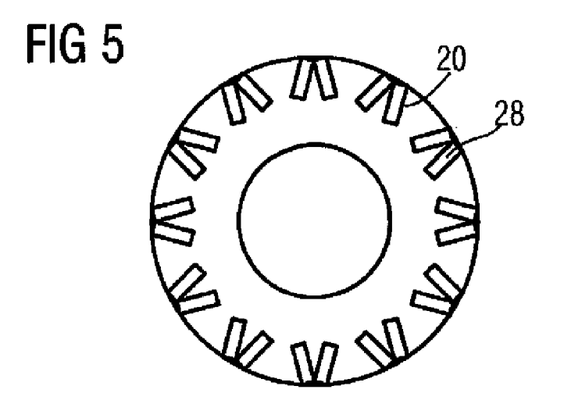

FIGS. 4 and 5 show each a rotor 28. In FIG. 4, the permanent magnets 20 are attached on the outer periphery of the rotor 28 and secured by a banding 19. According to FIG. 20, the permanent magnets 20 are placed in flux concentration direction in the lamination stack of the rotor 28.

Figure 6:
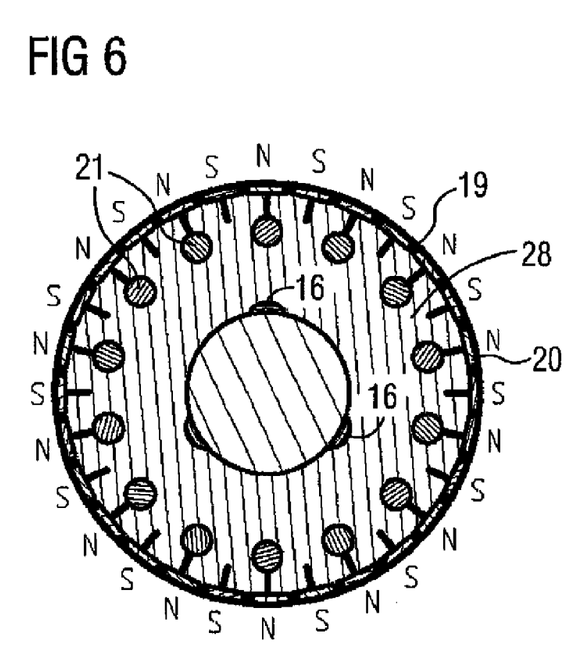
FIG. 6 shows a rotor with permanent magnets and at least one squirrel cage.

FIG. 6 shows a rotor 28 with permanent magnets 20 attached on the outer periphery of the rotor 28 and secured by a banding. In addition, at least one induction cage 21 is placed in the lamination stack of the rotor 28 for additionally utilizing the torque of the harmonics.

Figure 7:
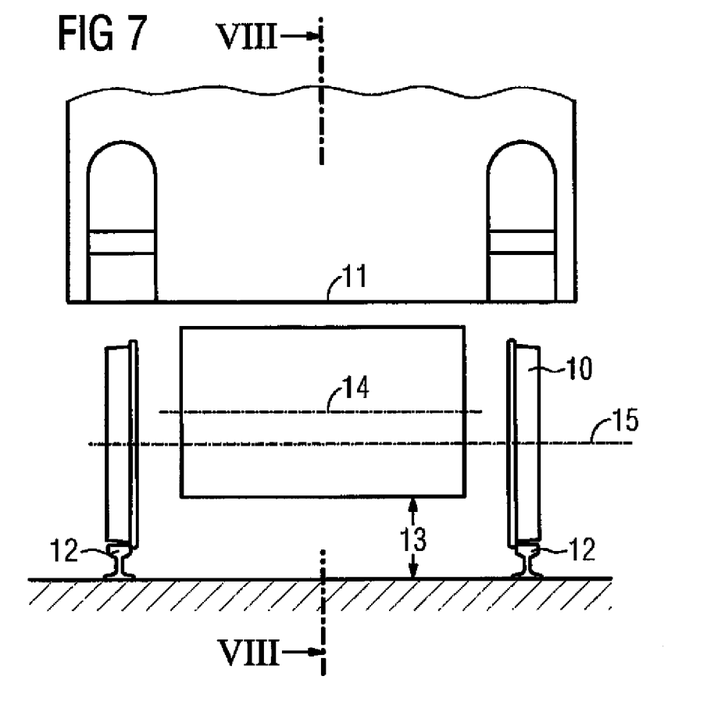
FIGS. 7 and 8 show a conventional electric machine upon a vehicle body.
Figure 8:
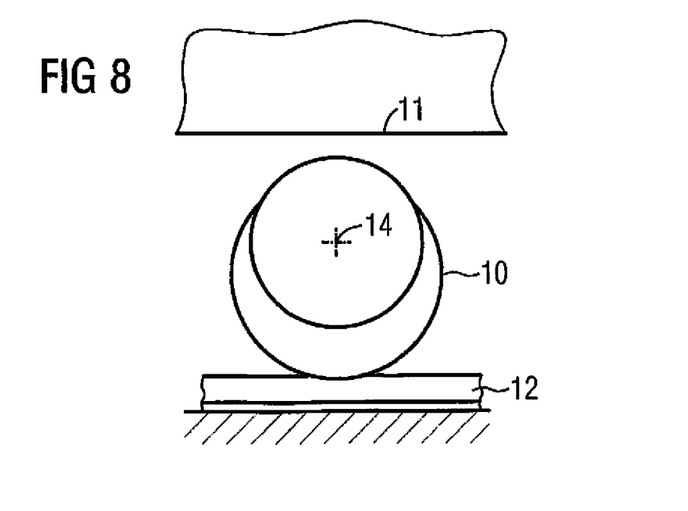

FIGS. 7, 8 show a front view of a basic arrangement of a conventional electric machine in a vehicle body 11 as drive for a propulsion vehicle not shown in greater detail. A predefined ground clearance 13 is hereby basically to be maintained between the upper edge of the rails 12 and the lower edge of the electric machine 1. This is to be considered in particular when direct drives are involved. In electric machines 1 having a transmission for propelling, e.g., a wheel set 10, the machine axis 14 may be disposed above the wheel set shaft 15 to provide the required ground clearance 13. As a consequence, the lower edge of the vehicle body 11 must be elevated, adversely affecting, i.a., comfort.

Figure 9:
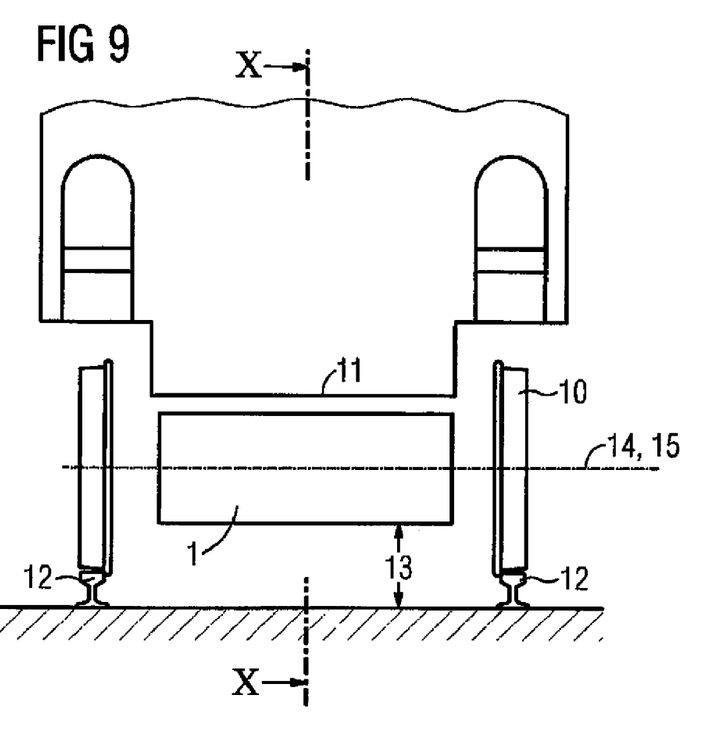
FIGS. 9 and 10 show an electric machine according to the invention upon a vehicle body.
Figure 10:
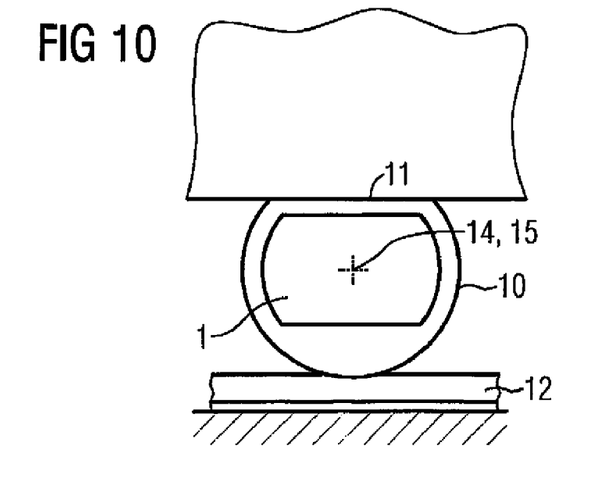

FIGS. 9, 10 show by way of identical views the geometric conditions of an electric machine 1 according to the invention, which is designed preferably as permanent-excited synchronous machine. The required ground clearance is maintained while the vehicle body 11 is lowered at the same time.

FIGS. 11 to 18 show further options of arrangements for the electric machine 1 according to the invention as traction motor of propulsion vehicles. The electric machine 1 is hereby arranged according to FIG. 11 as unsprung wheel set drive in coaxial relationship about the axis of the wheel set 10. This results in the afore-mentioned advantages, in particular for low-floor vehicles.

Figure 12:
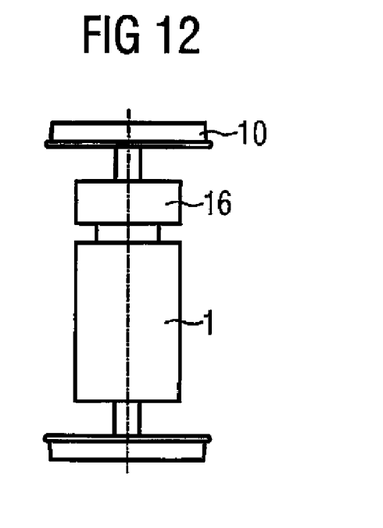

FIG. 12 shows a wheel set drive in which the electric machine 1 and transmission 16 are disposed in coaxial relationship about the axis of the wheel set 10.

Figure 13:
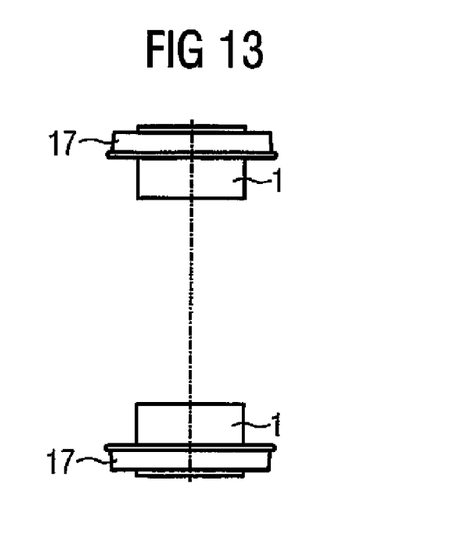

FIG. 13 shows the electric machine as direct drive of a single wheel 17.

Figure 14:
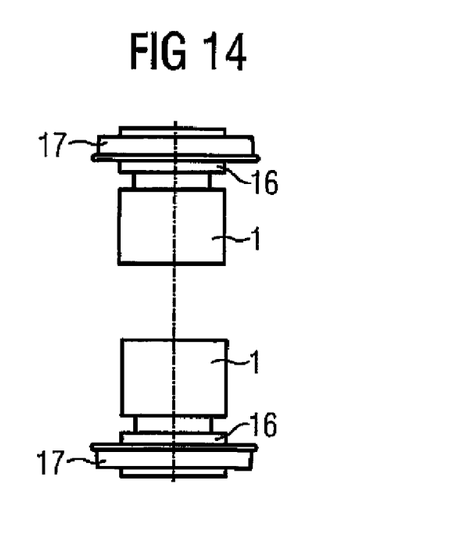

FIG. 14 shows the electric machine 1 and a transmission 16 in coaxial relationship about the axis of the single wheel 17.

Figure 15:
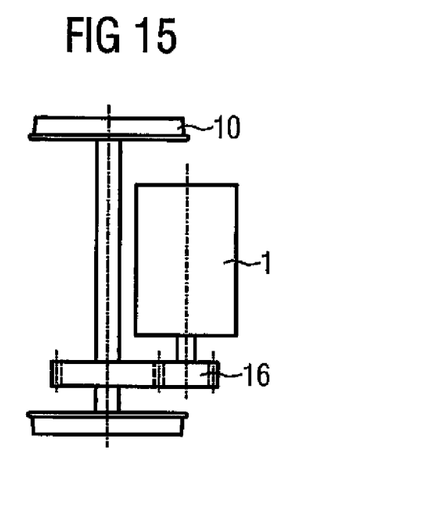

FIG. 15 shows the electric machine 1 extending across, with a transmission 16 for driving the wheel set 10.

Figure 16:
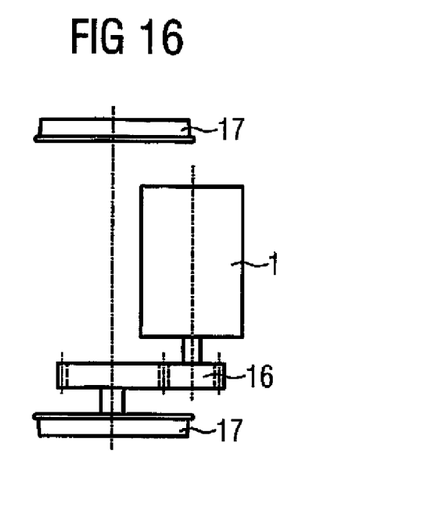

FIG. 16 shows the electric machine 1 extending across, with a transmission 16 for driving a single wheel 17.

Figure 17:
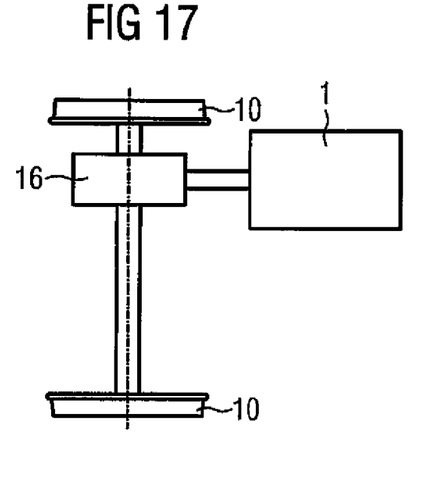
Figure 18:
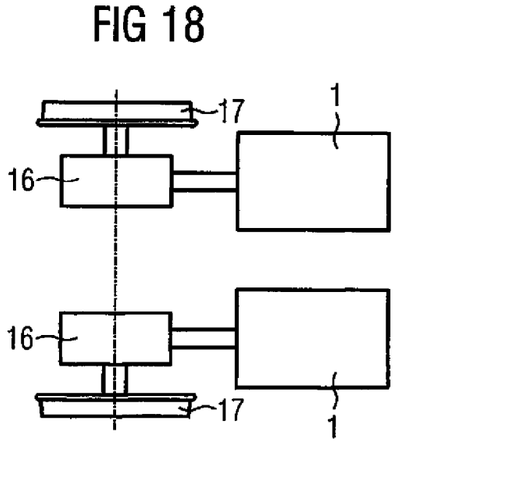

FIG. 17 and FIG. 18 differ essentially from FIG. 15 and FIG. 16 by the lengthwise arrangement of the electric machine 11

Figure 11:
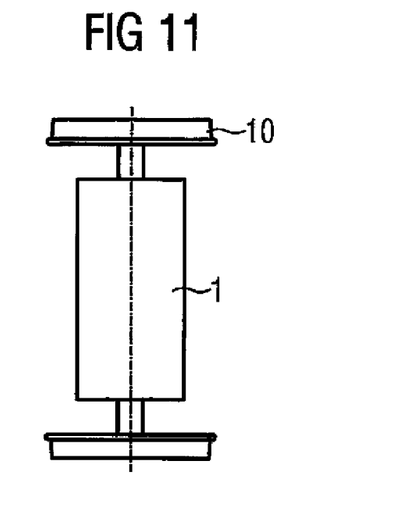
FIGS. 11 to 18 show fundamental arrangements of an electric machine according to the invention upon wheel sets or single wheels.
Figure 19:
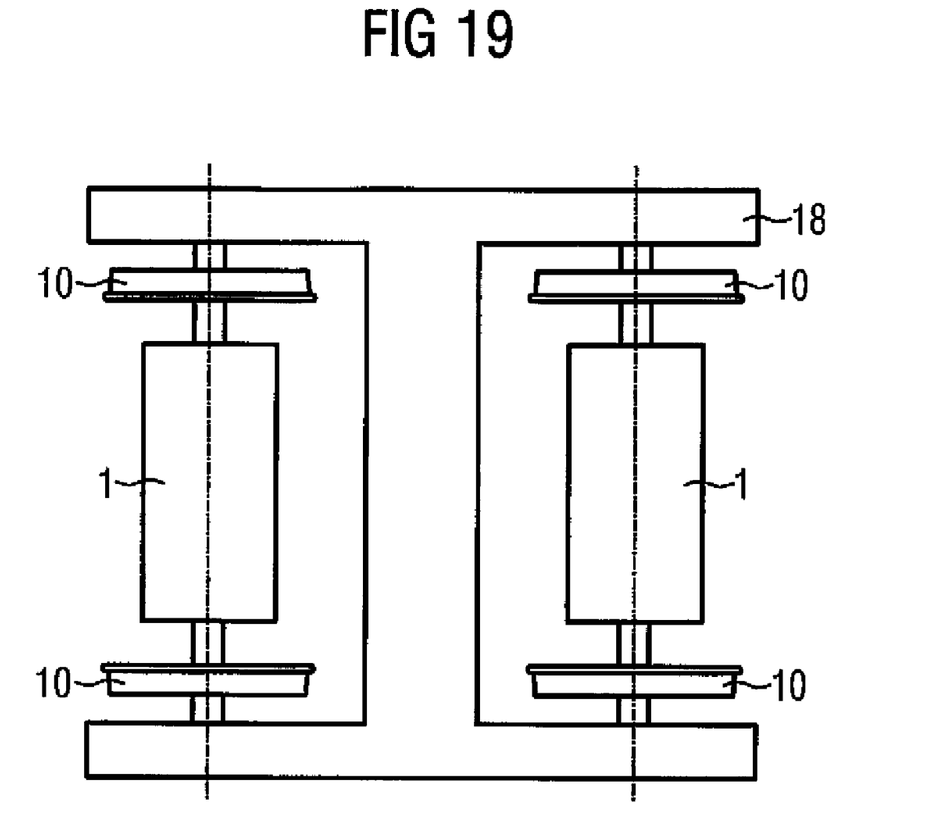
FIG. 19 shows an arrangement of the electric machine with optional transmission in an undercarriage.

FIG. 19 shows, by way of example, the arrangement of a drive variation according to FIG. 11 in a traction motor frame 18 which includes i.a. bearing systems not shown in greater detail.

Figure 20:
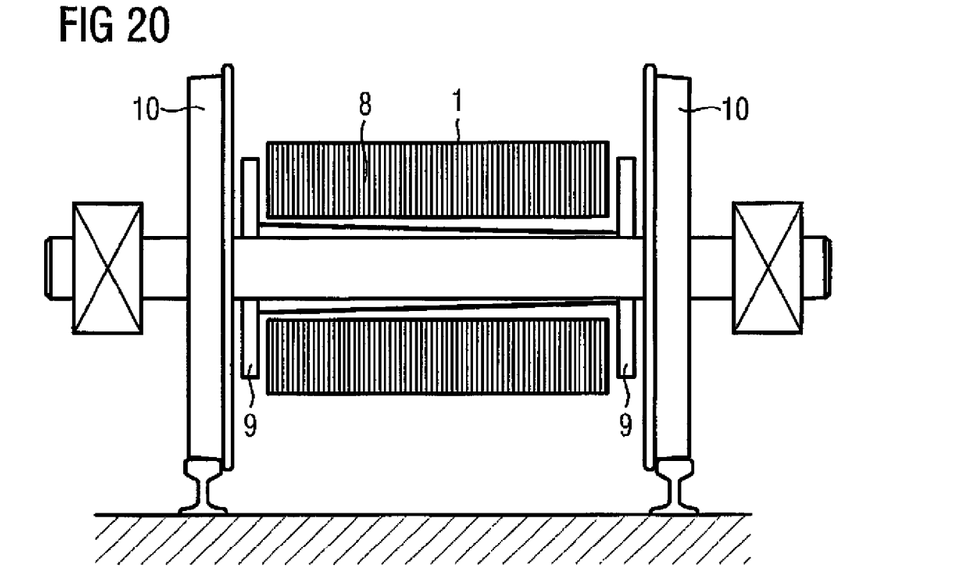
FIG. 20 shows a side view of a cushioned direct drive.

FIG. 20 shows a basic illustration of a longitudinal section of a cushioned direct drive for application as a synchronous machine according to the invention. Through intervention of an articulated lever clutch 9, a cardan hollow shaft 8 is propelled on the motor side and coupled to a wheel set 10.

FIG. 21 shows a cross section of an unsprung direct drive of a wheel set 10. The direct drive maintains the required distances in relation to the lower edge of the vehicle body 11 as well as in relation to the upper edge of the rails 12 while the electric machine 1 has the same output power. The laminations 2 of the stator are provided with tooth coils 7. The slotless sections 3 of the laminations 2 ideally face the rail 12 and vehicle body 11, respectively. A rotor 28 surrounds the wheel set shaft 15. The rotor 18 has permanent magnets 20 about its outer periphery, as shown in more detail in FIGS. 19 and 20.

It may be necessary in machine tools or other production machines, to suit the number as well as the disposition of slot less sections 3 relative to one another on the laminations 2 to the situations at hand.

Furthermore, the tooth flanks of adjacent teeth may extend in parallel relationship so that the installation with tooth coils 7 is facilitated.

What is claimed is:

1. An electric propulsion vehicle, comprising:
    a vehicle body;
    a wheel set mounted to the vehicle body; and
    a direct drive operatively connected directly to the wheel set for torque transmission for mobility of the wheel set on rails, said electric machine including a rotor, a stator spaced from the rotor by an air gap and formed by a plurality of laminations having axial slots and teeth extending between adjacent slots in a direction of the air gap, wherein the laminations have two sections configured without slots while following a contour of a stator bore in the area of the air gap and positioned in circumferential direction of the stator in opposing relationship between the vehicle body and the rails; and pre-fabricated tooth coils concentrated about at least a predefined number of teeth in one-to-one correspondence.

2. The electric propulsion vehicle of claim 1, wherein the sections cover 60° of a circumferential area of the laminations.

3. The electric propulsion vehicle of claim 1, wherein the rotor has permanent magnets.

4. The electric propulsion vehicle of claim 1, wherein the rotor has at least one induction cage.

5. The electric propulsion vehicle of claim 1, wherein the stator has a gapped tooth coil winding.

* * * * *